United States Patent [19]
Weller

[11] Patent Number: 5,448,221
[45] Date of Patent: Sep. 5, 1995

[54] DUAL ALARM APPARATUS FOR MONITORING OF PERSONS UNDER HOUSE ARREST

[76] Inventor: Robert N. Weller, 3027 Lynndale Rd., Virginia Beach, Va. 23452

[21] Appl. No.: 98,712

[22] Filed: Jul. 29, 1993

[51] Int. Cl.⁶ .................................................. G08B 3/10
[52] U.S. Cl. ................................... 340/539; 340/568; 340/573; 342/50; 455/67.7
[58] Field of Search ............... 340/539, 568, 571, 572, 340/573; 455/67.7, 67.6, 67.4; 342/28, 50, 458

[56] References Cited

U.S. PATENT DOCUMENTS

| | | | |
|---|---|---|---|
| 2,910,683 | 10/1959 | Todd | 342/50 |
| 3,739,378 | 6/1973 | Botzum et al. | 342/50 |
| 3,863,256 | 1/1975 | Smith | 342/458 |
| 4,113,382 | 9/1978 | Freudenschuss | 342/50 |
| 4,593,273 | 6/1986 | Narcisse | 340/539 |
| 4,598,272 | 7/1986 | Cox | 340/571 |
| 4,853,692 | 8/1989 | Wolk et al. | 340/539 |
| 4,980,671 | 12/1990 | McCurdy | 340/573 |
| 5,218,344 | 6/1993 | Ricketts | 340/539 |
| 5,255,306 | 10/1993 | Melton et al. | 340/573 |

*Primary Examiner*—John K. Peng
*Assistant Examiner*—Daniel J. Wu
*Attorney, Agent, or Firm*—Parkhurst, Wendel & Rossi

[57] ABSTRACT

A monitoring system determines the presence of the person or persons to be monitored within a well-defined area or areas using one or more portable remote devices which are in two-way communication contact with a base unit. The base unit is connected to a telephone line to enable communication with a monitoring service. The base unit and remote unit incorporate spread spectrum communication technology which permits a high transmit power level. The effectiveness of the monitoring system does not depend on radio signal strength, but instead, operates using a radio ranging method that measures the time it takes for a security-coded signal to be transmitted to and returned from the remote device. The remote device also includes a mechanism for sounding an audible out-of-range warning alarm in the event that the person being monitored exceeds the house arrest boundaries. A second audible alarm preferably sounds from the remote device and the base device at predetermined times after the sounding of the out-of-range alarm if the person does not return to the house arrest area.

21 Claims, 3 Drawing Sheets

REMOTE UNIT (22)

BASE UNIT (10)

DUAL ALARM APPARATUS FOR MONITORING OF PERSONS UNDER HOUSE ARREST

FIELD OF THE INVENTION

The invention relates in general to systems for monitoring the location of individuals. More specifically, the invention relates to a system for monitoring the movements of individuals under house arrest.

BACKGROUND OF THE INVENTION

The cost of providing detention facilities to cope with ever increasing numbers of individuals requiring detention, such as convicted criminals, defendants awaiting trial or suspects, has led many local and state government justice systems to alternative forms of sentencing and detention including house arrest with electronic monitoring. Conventional house arrest monitoring systems utilize a radio transmitter, with associated control electronics, that is affixed to the person under house arrest with a wrist or ankle band. The radio transmitter periodically transmits a one-way coded signal to a radio receiving apparatus at a base station. The radio receiving apparatus is connected to a telephone line to enable communication with a monitoring service. Electronic circuitry within the radio receiving apparatus provides either automatic answering or automatic periodic dialing to effect communication with the monitoring service, thereby enabling the monitoring service to determine the status of the monitored person under house arrest. The radio receiving apparatus supplies an alarm signal to the monitoring service system if the receiving apparatus fails to receive the coded signal from the radio transmitter, as failure to receive the coded signal is interpreted as indicating that the monitored person has moved outside the confines of the permitted house arrest area.

Conventional house arrest monitoring systems of the type described above are subject to a number of deficiencies. For example, the devices do not issue a warning to the wearer as to maximum range of communication, i.e., when the boundary of the house arrest area is approached. Thus, the wearer may inadvertently cross the boundary and violate the house arrest conditions or in some manner defeat the device by creating physical barriers to transmission. In addition, if the wearer intentionally violates the house arrest conditions, the devices do not provide a mechanism for identifying the wearer as a violator to other individuals. Thus, the violator can often conceal or remove the ankle band or wrist band containing the transmitter and avoid detection as a violator. While the violation is reported to the monitoring service, the violator has the opportunity of fleeing and/or blending in with the general public before a description of the violator can be widely circulated. Conventional systems also use unsophisticated narrow band radio devices of a type generally used to operate garage doors or control the door locks of automobiles. The narrow band devices are only permitted to operate at very low transmit power levels and frequently do not provide sufficient range to permit sufficient tracking or full coverage of a violator's home or permitted house arrest area. In addition, technically knowledgeable individuals can easily defeat conventional systems due to a lack of security measures within their systems.

In view of the above, it is an object of the invention to provide a monitoring system that overcomes the deficiencies of conventional house arrest monitoring systems.

SUMMARY OF THE INVENTION

The invention provides a monitoring system that determines the presence of the person or persons to be monitored within a well-defined area or areas. The monitoring system utilizes one or more portable remote devices which are in two-way communication contact with a base unit, either fixed or portable, located in the general area of permitted occupation of the monitored person. The base unit is connected to a telephone line or other means providing distant communication, thereby enabling the base unit to communicate with a monitoring service. The base unit and remote device preferably incorporate spread spectrum communication technology which permits a much higher transmit power level, consistent with current U.S. regulations for end user, license-free operation, than prior art systems.

The effectiveness of the preferred embodiment of the monitoring system incorporating spread spectrum communication technology does not depend on radio signal strength, but instead, operates using a radio ranging method that measures the time it takes for a security-coded signal to be transmitted to and returned from the remote device. The base unit transmits an alarm to a monitoring service if it determines that the person wearing the remote device is outside of the house arrest area based on the radio ranging method, and preferably also sounds an audible alarm.

The remote device also includes a mechanism for sounding an audible out-of-range warning alarm in the event that the person being monitored exceeds the house arrest boundaries or in some other manner ranges out of communication with the base unit. A second audible alarm preferably sounds from the remote device and the base unit a predetermined time after the sounding of the out-of-range alarm if the person does not return to the house arrest area. The second audible alarm alerts the police, security personnel and the general public as to the presence of a violator of house arrest. The second audible alarm is preferably repeated at random time intervals, and is also sounded if the subject of house arrest attempts to tamper with the remote unit. If tampering is detected, the remote device ceases all communication with the base unit thereby alarming the base unit of the violation.

BRIEF DESCRIPTION OF THE DRAWINGS

With the above as background, reference should now be made to the following detailed description of the preferred embodiments of the invention and the accompanying drawings, wherein.

DETAILED DESCRIPTION OF THE PREFERRED EMBODIMENT

Figure 1:
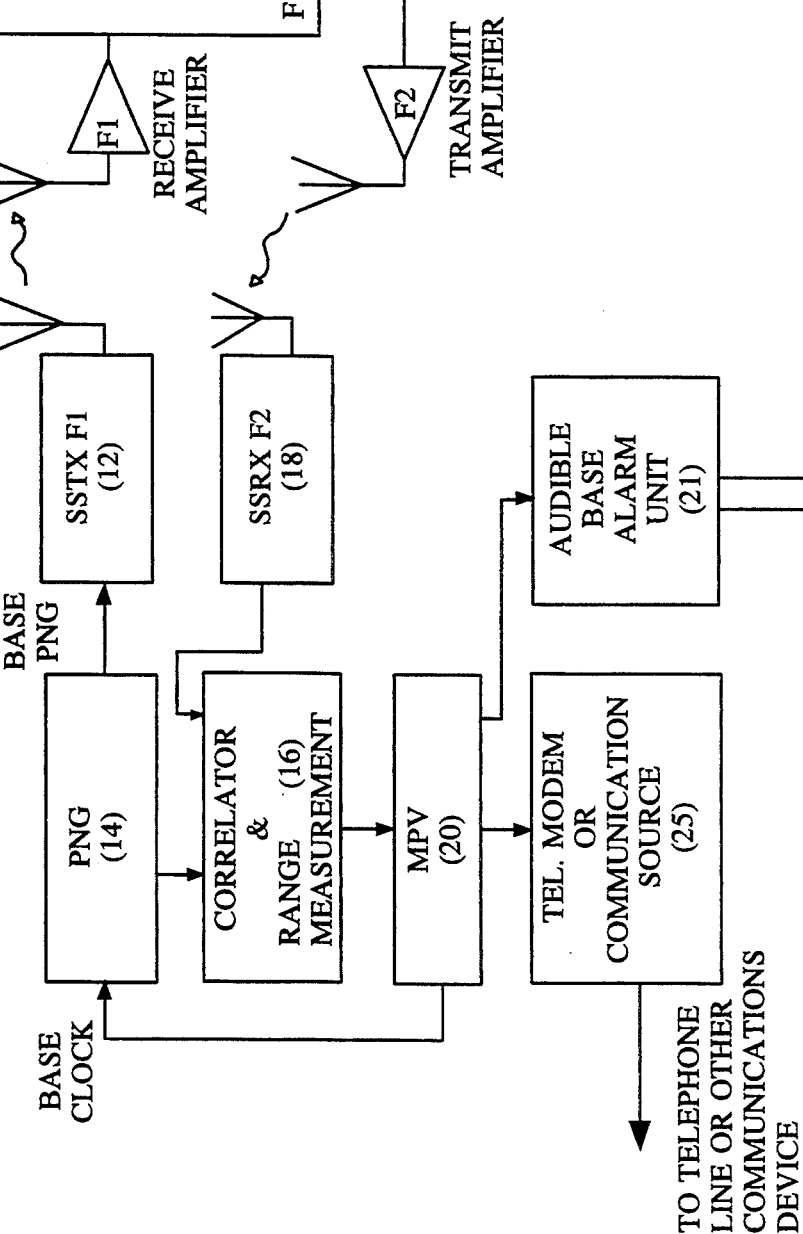
FIG. 1 is a block diagram of a base unit in accordance with the invention.
Figure 3:
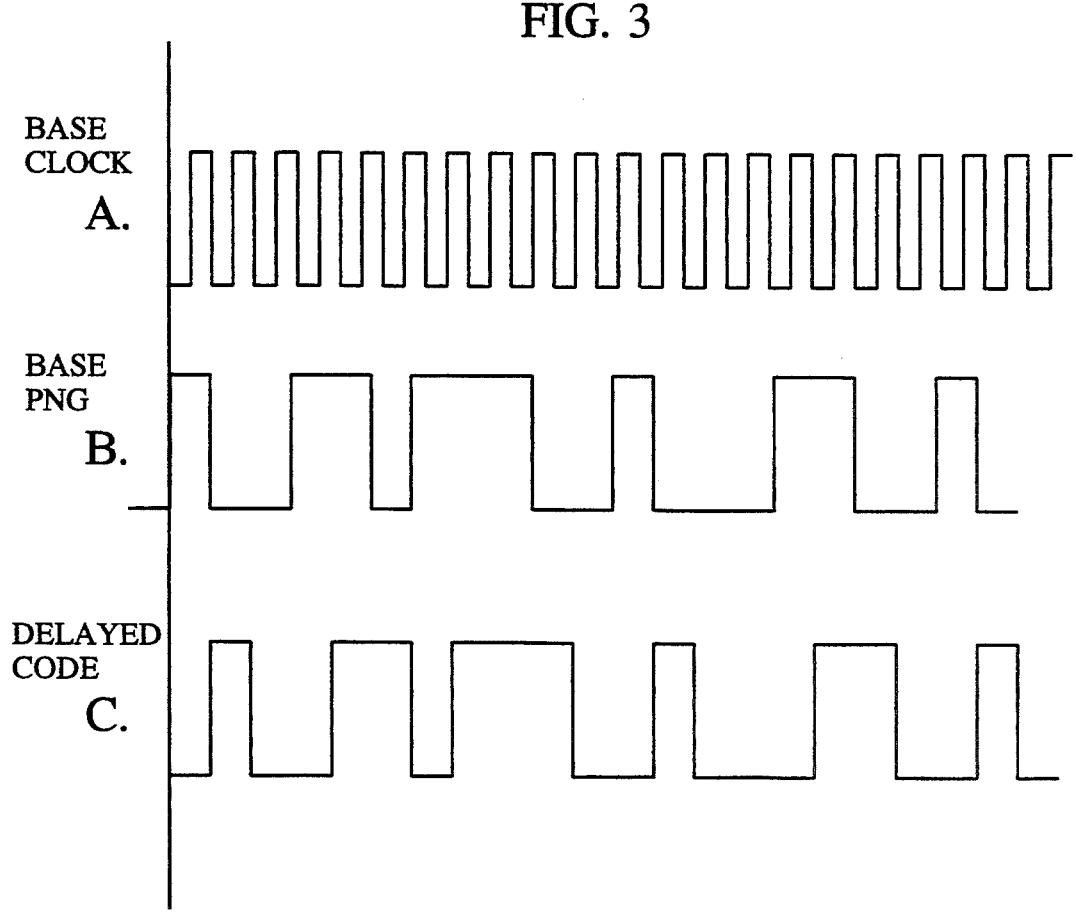
FIG. 3 is an electrical timing diagram showing range measurement employed by the base unit illustrated in FIG. 1.

Referring to FIG. 1, a base unit 10 is illustrated as including a direct sequence spread spectrum transmitter (SSTX) 12 and a pseudo noise generator (PNG) 14. The SSTX 12 uses the signal generated by the PNG 14 to spread a radio frequency carrier signal which is transmitted on a first frequency of F1. The pseudo noise generator PNG 14 signal from the spread spectrum transmitter 12 is also supplied to a correlator and range measurement unit 16 which is coupled to a direct sequence spread spectrum receiver SSRX 18 with a center frequency of F2. As will be described in greater detail below, the correlator and range measurement unit 16 extracts range data from the signal supplied by the SSRX 18, based in part on the signal supplied by the PNG 14, and supplies the range data to a microprocessor unit (MPU) 20, which controls the operation of the base unit. The MPU 20 controls the overall operation of the base unit 10 and preferably generates two levels of alarm signals when the range data shows that a predetermined threshold is exceeded. The MPU 20 also controls the operation of a telephone modem 25, to permit the base unit 10 to communicate with a monitoring service, and the operation of an audible base alarm unit 21 equipped with an audio transducer 23, which is used to generate audible alarm signals as will be described in greater detail below.

Figure 2:
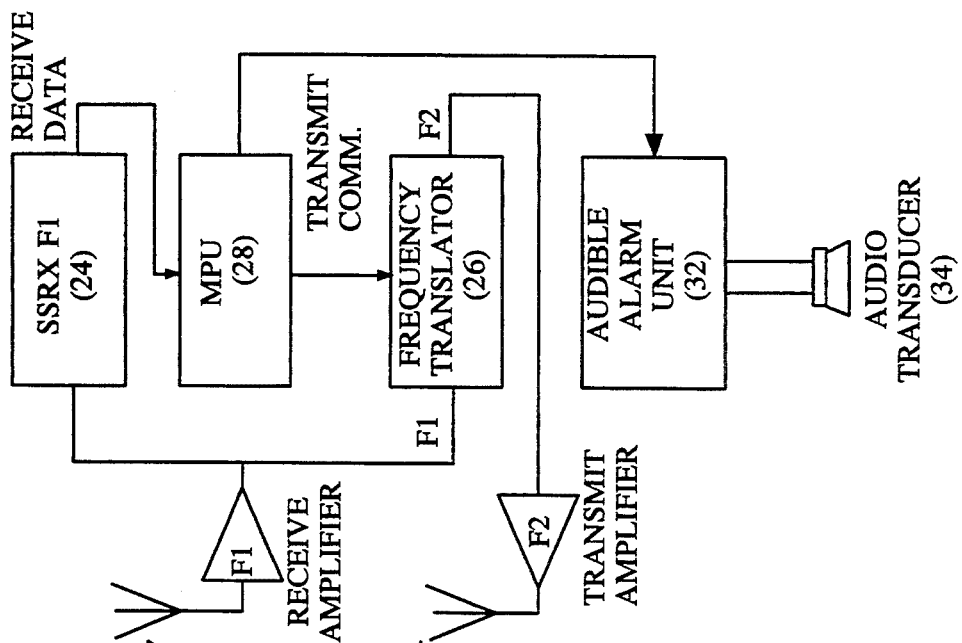
FIG. 2 is a block diagram of a remote device in accordance with the invention.

Referring now to FIG. 2, a remote device 22 is shown including an F1 receive amplifier coupled to a direct sequence spread spectrum receiver (SSRX) 24 and a frequency translator and transmitter (FT) 26, which in turn is coupled to an F2 transmit amplifier. The output from the SSRX 24 is supplied to a microprocessor control circuit 28 which controls the operation of the FT 26 and an audible alarm unit 32 coupled thereto. The control circuit 28 controls the overall operation of the remote device 22 and preferably includes a microprocessor unit and a battery power supply which is not shown in the drawing. The SSRX 24, the FT 26, control circuit 28 and alarm unit 32 are preferably contained in a waterproof electronics package, encased in high-impact plastic or other appropriate material, and are coupled to a surgical steel band (or other tamper-proof metal) designed to fit around the ankle or wrist of the person to be monitored.

Figure 4:
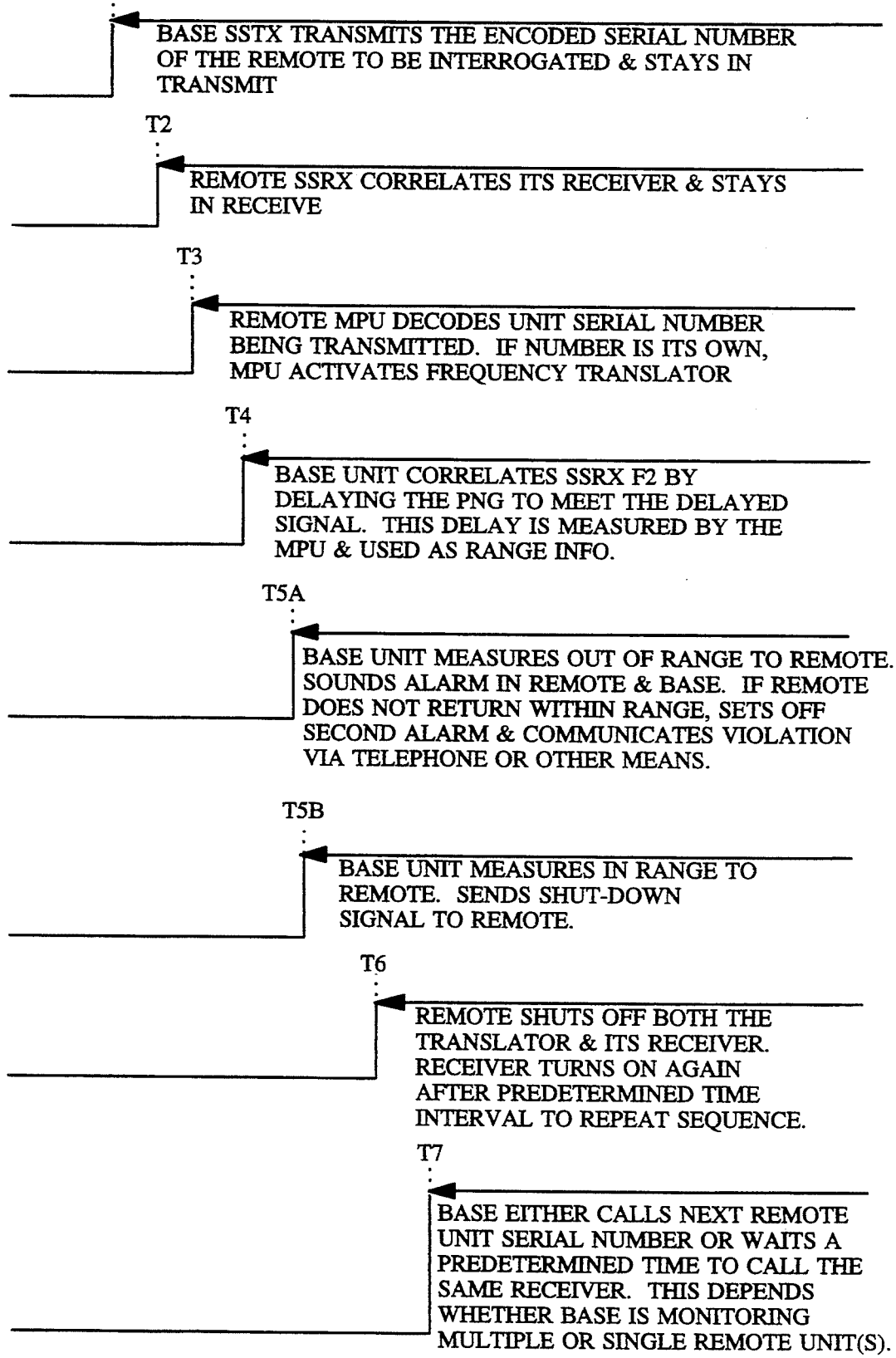
FIG. 4 is a flow chart illustrating the operation of the base unit and remote device.

In operation (refer to FIG. 4), the base unit 10 periodically transmits a signal, which includes an identification number assigned to the remote device 22, on the first frequency F1. The periodic transmission of the signal sent by the base unit 10 to inquire of the remote device 22 is designed to conserve battery power in the remote device 22 by permitting the remote device's receiver to power down between transmissions. The spread spectrum signal contains data which is modulo two, added to the PNG signal used to spread the F1 frequency from the base transmitter SSTX 12. Alternatively, the data can be frequency modulated onto the F1 frequency prior to spreading. The resulting spread spectrum signal, including the ID number of the targeted remote device 22, is received by the remote device 22 worn by the person being monitored.

The remote device 22 being interrogated by the base unit 10 receives the signal and demodulates it by means of the SSRX 24. Data received from the base unit 10 by the remote unit 22 is processed by the microprocessor control circuit 28. The remote device 22, being interrogated and recognizing its ID number, begins retransmission of the entire F1 signal to the base unit 10 on a second frequency F2 using the FT 26. The SSRX 18 of the base unit receives the F2 signal and supplies the signal to the correlator and data range measurement unit 16.

The correlator and range measurement unit 16 simultaneously measures the distance between the base unit 10 and the remote device 22 by comparing the time between the sending of the F1 signal and the receipt of the F2 signal. Radio signals travel at the speed of light, namely 300 million meters per second. It is therefore possible to calculate the range of the remote device 22 from the base unit 10 by comparing the time relationship between the transmitted signal F1 and the required delay in the correlator to despread the returned signal F2. As an example, the PNG code is generated from a clock running at 10 MHz, which equates to 100 nanoseconds per clock cycle. A radio wave will travel 30 meters in 100 nanoseconds. Considering that the base unit 10 sends to the remote device 22 on frequency F1 with the remote device sending the signal back on frequency F2 to the base unit 10 for measurement, and excluding any delays due to frequency translation, a 100 nanosecond delay equates to the remote unit 22 being 15 meters away from the base unit 10. The delay increases as the remote device 22 gets further away from the base unit 10, and conversely decreases as the remote unit 22 gets closer.

If the remote device 22 is measured as being in its permitted range, then base unit 10 instructs remote unit 22 to power down until next interrogation. The base unit 10 now has the opportunity to check other remote devices. If the remote device 22 has exceeded the permitted range, however, the base unit 10 transmits an alarm signal to the remote device 22. The remote device 22 activates the alarm unit 32 in response to receiving the alarm signal in order to generate an audible out-of-range warning signal using an audio transducer 34. Preferably, the base unit 10 also generates an audible out-of-range warning signal by activating the base alarm unit 21 that controls the audio transducer 23.

If the base unit 10 continues to determine that the remote device 22 has exceeded the preprogrammed range limit after a sufficient time period to permit the person to return to the house arrest area, the base unit 10 sends a violation signal to the remote device 22 causing the remote device 22 to generate an audible violator signal using the alarm unit 32. In addition, the base unit 10 preferably activates the base alarm unit 21 to also generate an audible violator signal using the audio transducer 23, and informs a monitoring service of the violation using the telephone modem 25 or some other means of remote communication. Alternatively, the remote device 22 can monitor the duration of the receipt of the alarm signal from the base unit 10 and activate the alarm unit 32 to produce the audible violator signal after a preset time period without requiring receipt of a violation signal from the base unit 10. In either case, the audible violator signal sounds for a predetermined time period and is reactivated by the remote device 22 on a random basis to preclude the wearer from calculating a safe interval to move in public with no alarm sound.

In addition to generating the audible violator signal when the person moves out of the house arrest area, the base unit 10 and the remote device 22 preferably activate their respective alarm units in the event of loss of two-way communication. Thus, the remote device 22 is not dependent on the receipt of the violation signal from the base unit 10 to activate the audible violator alarm signal, and any attempt to disrupt communications between the base unit 10 and the remote device 22 will result in an alarm being sounded.

The system shows great improvement over existing systems with its ability to measure range without relying on signal strength measurement. This provides for a more powerful transmitter and few problems associated with false alarms.

While the preferred embodiment described uses for its portable unit a spread spectrum receiver and a frequency translator, it must be pointed out that other spread spectrum ranging methods can also be implemented. See Spread Spectrum Systems, Second Edition, Robert C. Dixon, A Wiley Interscience Publication ISBN 0-47188309-3, Page 291. Also, a non spread spectrum signal which is modulated by timing pulses could be utilized. Also, it should be noted that the serial number/numbers of the portable devices are preferably scrambled or sent secure from the base unit.

The improvement of two-way communication between the base and the portable device permits the unique dual alarm system. It is obvious that even without the spread spectrum ranging system that two-way communications alone with the dual alarm system will improve the prior art greatly. Thus, the invention is not limited to the use of spread spectrum communications technology or range measurement, but can also be employed with other communications technology including narrow band radio.

Further features include the use of an anti-tamper device or circuit which will cause the portable device to alarm or shut down communication with the base unit, thereby causing the base unit to notify the monitoring service of a violation. The anti-tamper device may include a circuit for passing a current through the band used to attached the remote device to the person being monitored, such that cutting the band will result in a break in the circuit. Also, a battery backup supply in the base unit will provide for power outages. The system can further be programmed to provide a time period to permit the wearer to be absent from the area of incarceration. This would, for instance, permit the person to travel to and from work where a second base unit would be installed, and would permit a person to be more productive while under house arrest.

The invention has been described with reference to certain preferred embodiments thereof. It will be understood, however, that modifications and variations are possible within the scope of the appended claims. For example, the monitoring system is not limited to monitoring individuals under house arrest, but could be employed for a variety of uses including monitoring prison road gangs or the monitoring of children in day care centers or other locations, the monitoring of patients prone to wander from hospital grounds or retirement homes, and the monitoring of employees within a work site. The invention is also not limited to the specific structural arrangement of circuit elements. For example, the functions performed by the correlator and range measurement unit could be incorporated within the MPU.

What is claimed is:

1. A monitoring system comprising:
   a base unit including a transmitter coupled to a base control unit, range measurement means coupled to the base control unit for generating range data, and remote communication means coupled to the base control unit for communicating with a monitoring service; and
   at least one portable remote device including a receiver, a transmitter, and an alarm unit, each of which is coupled to a control unit;
   wherein the base unit periodically transmits a signal to the portable remote device and the portable remote device transmits a signal back to the base unit;
   wherein the range measurement means generates range data based on a time difference between the signal transmitted from the base unit and receipt of the signal transmitted from the remote device;
   wherein the base control unit compares the range data to a predetermined permitted range and generates an alarm signal if the range data exceeds the predetermined range;
   wherein the base unit transmits the alarm signal to the remote device and the control unit of the remote device activates the alarm unit to generate an audible out-of-range signal in response to the alarm signal; and
   wherein the base unit transmits a violation signal to the remote device if the range data exceeds the predetermined range for a preset time interval, and the control unit of the remote device activates the alarm unit to generate an audible violator signal in response to the violation signal.

2. A monitoring system as claimed in claim 1, wherein the alarm unit produces the audible violator signal at random time intervals.

3. A monitoring system as claimed in claim 1, wherein the base unit transmits a notice of violation message to the monitoring service using the remote communication means if the range data exceeds the predetermined range for a preset time interval.

4. A monitoring system as claimed in claim 1, wherein the base unit further comprises a base alarm unit, and the base control unit controls the base alarm unit to generate an audible violator signal if the range data exceeds the predetermined range for a preset time interval.

5. A monitoring system as claimed in claim 1, wherein the base unit further comprises a base alarm unit, and the base control unit controls the base alarm unit to generate an audible out-of-range signal in response to the alarm signal.

6. A monitoring system as claimed in claim 1, wherein the base unit transmits the signal to the remote device at a first frequency and the remote device transmits the signal to the base unit at a second frequency.

7. A monitoring system as claimed in claim 1, wherein the transmitter and receiver of the base unit and the transmitter and receiver of the remote device are direct sequence spread spectrum devices.

8. A monitoring system comprising:
   a base unit including a transmitter coupled to a base control unit, range measurement means coupled to the base control unit for generating range data, and remote communication means coupled to the base control unit for communicating with a monitoring service; and
   at least one portable remote device including a receiver, a transmitter, and an alarm unit, each of which is coupled to a control unit;
   wherein the base unit periodically transmits a signal to the portable remote device and the portable remote device transmits a signal back to the base unit;

wherein the range measurement means generates range data based on a time difference between the signal transmitted from the base unit and receipt of the signal transmitted from the remote device;

wherein the base control unit compares the range data to a predetermined permitted range and generates an alarm signal if the range data exceeds the predetermined range;

wherein the base unit transmits the alarm signal to the remote device and the control unit of the remote device activates the alarm unit to generate an audible out-of-range signal in response to the alarm signal; and wherein the remote device activates the alarm unit to produce a violator signal if the remote device continues to receive the alarm signal from the base unit for a predetermined time period.

9. A monitoring system as claimed in claim 4, wherein the base control unit activates the base alarm unit and the control unit of the remote device activates the alarm unit of the remote device in the event of a loss of communication between the base unit and the remote device.

10. A monitoring system comprising:
a base unit including a transmitter, a receiver, a base control unit, and remote communication means for communicating with a monitoring service; and
at least one portable remote device including a receiver, a transmitter, an alarm unit and a control unit;
wherein the base unit periodically transmits a signal to the portable remote device, the portable remote device transmits a signal back to the base unit, and the base unit transmits an alarm signal to the remote device when the signal transmitted from the remote device indicates an out-of-range condition, the control unit of the remote device being responsive to the alarm signal to activate the alarm unit to generate an audible out-of-range signal; and
wherein the base unit transmits a violation signal to the remote device if the signal transmitted from the remote device indicates the out-of-range condition has exceeded a preset time interval and the control unit of the remote device activates the alarm unit to generate an audible violator signal in response to the violation signal.

11. A monitoring system as claimed in claim 10, wherein the alarm unit produces the audible violator signal at random time intervals.

12. A monitoring system as claimed in claim 10, wherein the base unit transmits a notice of violation message to the monitoring service using the remote communication means in response to the generation of at least one of the alarm signal and the violation signal.

13. A monitoring system as claimed in claim 10, wherein the base unit further comprises a base alarm unit, and the base control unit controls the base alarm unit to generate an audible out-of-range signal in response to the alarm signal.

14. A monitoring system as claimed in claim 13, wherein the base control unit controls the base alarm unit to generate an audible violator signal in response to the violation signal.

15. A monitoring system as claimed in claim 13, wherein the base control unit activates the base alarm unit and the control unit of the remote device activates the alarm unit of the remote device in the event of a loss of communication between the base unit and the remote device.

16. A monitoring system comprising:
a base unit including a transmitter, a receiver, a base control unit, and remote communication means for communicating with a monitoring service; and
at least one portable remote device including a receiver, a transmitter, an alarm unit and a control unit;
wherein the base unit periodically transmits a first signal to the portable remote device and the portable remote device transmits a second signal back to the base unit in response to the first signal, and
wherein the control unit of the portable remote device activates the alarm unit to generate an out-of-range signal if the portable remote device fails to receive the first signal from the base unit, and activates the alarm unit to generate an audible violator signal if the portable remote device fails to receive the first signal from the base unit a predetermined time after the generation of the out-of-range signal.

17. A monitoring system as claimed in claim 16, wherein the alarm unit produces the audible violator signal at random time intervals.

18. A monitoring system as claimed in claim 16, wherein the base unit further comprises a base alarm unit, and the base control unit controls the base alarm unit to generate an audible out-of-range signal if the second signal is not received from the portable remote device.

19. A monitoring system as claimed in claim 18, wherein the base control unit controls the base alarm unit to generate an audible violator signal if the second signal is not received from the portable remote device for a predetermined time after the generation of the out-of-range signal.

20. A monitoring system as claimed in claim 16, wherein the base unit transmits a notice of violation message to the monitoring service using the remote communication means if the second signal is not received from the portable remote device.

21. A monitoring system comprising:
a base unit including a transmitter coupled to a base control unit, range measurement means coupled to the base control unit for generating range data, and remote communication means coupled to the base control unit for communicating with a monitoring service; and
at least one portable remote device including a receiver, a transmitter, and an alarm unit, each of which is coupled to a control unit;
wherein the base unit periodically transmits a signal to the portable remote device and the portable remote device transmits a signal back to the base unit;
wherein the range measurement means generates range data based on a time difference between the signal transmitted from the base unit and receipt of the signal transmitted from the remote device;
wherein the base control unit compares the range data to a predetermined permitted range and determines if the range data exceeds the predetermined range for a preset time interval; and
wherein the base unit transmits a violation signal to the remote device if the range data exceeds the predetermined range for a preset time interval, and the control unit of the remote device activates the alarm unit to generate an audible violator signal in response to the violation signal.

* * * * *